Patented Mar. 10, 1936

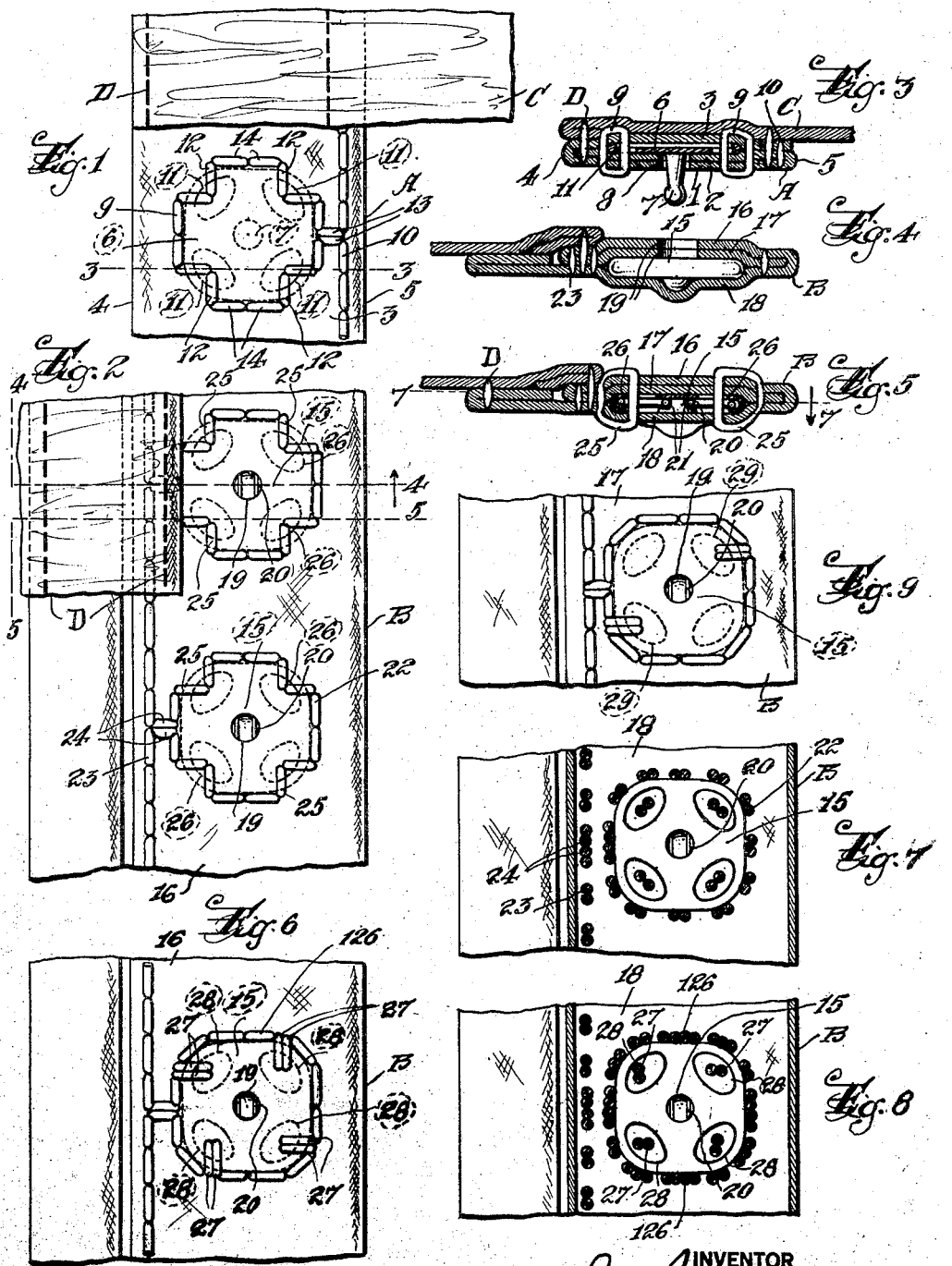
March 10, 1936. L. ROSEMAN 2,033,650
SNAP FASTENER TAPE
Filed Dec. 20, 1934

2,033,650

UNITED STATES PATENT OFFICE 2,033,650

SNAP FASTENER TAPE

Leo Roseman, Newark, N. J.

Application December 20, 1934, Serial No. 758,449

2 Claims. (Cl. 2—265)

This invention relates in general to fastener tape including a strip of fabric having separable fastener elements attached thereto, to be applied to the edges of openings in garments for fastening such edges together. More particularly the invention is directed to such fastener tape embodying so-called snap fasteners or head and socket fasteners.

Snap fastener tape is known in the art, as shown by my Patent No. 1,373,452 dated April 5, 1921, and in my copending application Serial No. 660,626 filed March 14, 1933, I have illustrated and described another form of snap fastener tape. In both of these forms of tape the snap fastener elements are arranged between two plies of material and are secured in position by lines of stitches passing through said plies snugly embracing the fastener elements at their edges or perimeters. Each fastener includes two strips of fabric each composed of a plurality of plies, to be secured for example to the edges of a garment opening such as the ends of a corset or brassière, one having head members secured thereon between two plies and the other having socket members to cooperate with said head members and certain of the plies have perforations in register with the respective heads and sockets to permit connection and disconnection of the complemental fastener elements.

These structures are not entirely satisfactory because the strength of attachment of the fastener elements to the fabric strip is limited to the ability of the fabric to resist the strains on the fasteners during use and upon separation of the head members from the socket members; and sometimes the tension on the fastener elements results in tearing one of the plies of fabric either around the edges of the elements or on lines transversely of the elements so as to allow the fastener elements to be pulled or detached from the strip. When the fabric tears in this way there is nothing left to hold the fastener elements on the strip.

Furthermore, the fastener elements, particularly the socket members, sometimes turn bottom side up or become reversed between the plies during use or laundering of the tape due to strains upon or stretching of the fabric plies at opposite sides of the fastener elements, so that the head or socket, as the case may be, is thrown out of register with the respective perforation in the fabric strip and cannot be connected to the complemental socket or head respectively of the other strip.

Therefore one object of my invention is to provide a novel and improved fastener tape of the general character described which shall embody a novel and improved construction, combination and arrangement of plies of fabric at least one at each of the opposite sides of the fastener elements, and stitches which shall directly interlock with the fastener elements and pass through at least said two plies of the strip to positively secure the fastener elements against movement in any direction on the strip, so that said stitches shall reduce the strains on the portions of the plies directly overlying the fastener elements and shall be capable of preventing displacement of the fastener elements should the fabric be torn.

The invention therefore contemplates a fabric strip formed of a plurality of superposed plies with fastener elements between two of said plies and having apertures to receive stitches, in combination with stitches passing through both of said plies and through said apertures.

Further the invention includes a generally annular continuous line of stitches surrounding each fastener element in snug embracing relation thereto and passing through both of said plies and also including offset stitches passing through said apertures and said plies.

A further object of my present invention is to provide snap fastener tape of the general character described wherein all of the fastener elements shall be sewed on the strip with one continuous line of stitches without jump stitches or interrupted stitches and without the necessity for cutting threads between the fastener elements, and said line of stitches shall also serve to secure the plies of the fabric strip together along their longitudinal edges, whereby the tape can be rapidly sewed on automatic machines and shall be inexpensive, the stitches shall be prevented from unravelling or pulling out around the fastener elements and the fasteners shall be securely attached to the fabric strip.

Referring to the accompanying drawing in which corresponding and like parts are designated throughout the several views by the same reference characters, Figure 1 is a fragmentary plan view of a fastener strip embodying the invention and including head fasteners and showing the strip attached to the edge of a garment.

Figure 2 is a similar view of the other fastener strip which carries the socket fasteners.

Figure 3 is a transverse vertical sectional view on the line 3—3 of Figure 1.

Figures 4 and 5 are similar views on the lines 4—4 and 5—5 respectively of Figure 2.

Figure 6 is a fragmentary plan view of a modified form of fastener tape having socket fasteners.

Figure 7 is a horizontal sectional view on the line 7—7 of Figure 5.

Figure 8 is a similar view of the form of the tape shown in Figure 6, and

Figure 9 is a fragmentary plan view of another modification of the tape.

Specifically describing the illustrated embodiment of the invention, the reference character A designates the tape or strip which carries the head fastener elements and B designates the tape or strip which carries the socket fastener elements to cooperate with the head fastener elements of the tape A. The tape A is shown as comprised of a strip of fabric composed of a single piece which is folded into a plurality of plies 1, 2 and 3. The plies are of substantially the same width, and are formed by longitudinally folding the strip at 4 to form the ply 3 and then again folding the fabric at 5 to form the ply 2 which is interposed between the plies 1 and 3. Obviously instead of forming the strip of one piece of material, the strip may comprise separate pieces of fabric arranged in superposed relation.

A plurality of head fastener elements 6 of known construction are arranged in a row in spaced relation longitudinally of the strip between the two adjacent plies 2 and 3 with the head 7 of each element facing toward the ply 2 and projecting through registering openings 8 in the plies 1 and 2 which also register with the head of the fastener element which projects through the openings. As shown, the fastener element is approximately square in plan view although it may be of any other suitable shape.

As shown, the head fastener elements 6 are securely attached to the fabric strip by means of a single continuous line of stitches in passing through the plies 1, 2 and 3, and including generally annular sets or lines of stitches 9 surrounding each fastener element at its perimeter in snugly embracing relation thereto, and other portions 10 each running longitudinally of the strip between two adjacent fastener elements. The fastener elements are formed with transverse apertures 11, preferably one adjacent each corner of the square element, and the annular sets of stitching 9 include offset stitches 12 which pass through the apertures 11 and all of the plies 1, 2 and 3. Preferably the longitudinal portions 10 are offset or spaced from the row of fastener elements and are connected with the portions 9 by stitches 13 which extend laterally of the strip. As shown, the longitudinal portions 10, the lateral stitches 13 and the portions 9 form parts of one continuous line of stitches and preferably the lateral stitches at 3 are disposed centrally of one side of the respective fastener element in radial relation thereto and at right angles to the longitudinal portions 10.

More specifically, the annular sets of stitches 9 include two stitches 14 at each side of the square element in snug relation to the perimeter of the element, while the stitches 12 are at approximately right angles to the stitches 14 and interlock with the fastener elements through the apertures 11.

A complemental strip B of fastener tape which carries the socket fasteners 15 is in general similar to the strip A. The strip B is also formed of three plies of fabric 16, 17 and 18, and the socket fastener elements 15 are arranged in a row in spaced relation longitudinally of the strip between the base ply 18 and the intermediate ply 17. The plies 16 and 17 are formed with registering openings 19 for each fastener element so that the head 7 of a head fastener element may be inserted into the socket of the socket fastener element for connecting the complemental elements. As usual, the socket members may have a spring wire 20, portions of which project into the socket through slots 21 to engage the head of the complemental fastener element 6.

The socket elements 15 are attached to the strip by a single continuous line of stitches identical with the line of stitches described in connection with the tape A. As shown, this line of stitches includes the generally annular portions 22 which encircle the fastener elements the portions 23 which extend longitudinally of the strip between adjacent fastener elements, the lateral stitches 24, and the offset stitches 25 which interlock with the fastener elements through apertures 26 in said elements corresponding to the apertures 11 of the fastener elements 6.

The two tapes may be applied to the edge portions C of a garment in the usual manner, the edge of the garment being laid over the strips and being secured thereto by lines of stitches D.

With this construction, the fastener elements can be sewed upon the fabric strip with a single continuous line of stitches and in one continuous operation so that the tape can be sewed on automatic machines, for example as shown in my application Serial No. 674,380, filed June 5, 1933, can be rapidly produced and is relatively inexpensive and attractive.

The fastener elements 6 and 15 of the two strips cooperate in the usual manner of head and socket fasteners or snap fasteners as shown in my above-mentioned Patent No. 1,373,452, the elements being connected by forcing the heads into the sockets of the socket members, and the two fastener elements being held together by the springs 20 which frictionally engage the heads 11. The fastener elements are separated by pulling the tapes apart so as to withdraw the heads 7 from the sockets. During this separating of the fastener strips, considerable strain is applied to the fastener elements both laterally and axially thereof. However, these strains are effectually resisted by the portions 9 and 22 of the lines of stitches which encircle the fastener elements, and particularly by the offset stitches 12 and 25. Furthermore, the offset stitches 12 and 25 effectually cooperate with the plies of fabric which overlie the face sides of the fastener elements so as to reduce the strains on the fabric, and consequently reduce the possibility of tearing of the fabric. In fact, the offset stitches 12 and 25 are adequate to secure the fastener elements to the strips even should the plies at the face sides of the fastener elements be torn or mutilated. The offset stitches also prevent lateral movement of the fastener elements on the tape so as to ensure that the fastener elements, especially the socket members, shall not move out of register with the openings 19 in the face plies of the strip; and these offset stitches also firmly fasten the face plies against the fastener elements to reduce the possibility of stretching of the face plies under the tension applied to the fastener elements while they are in use and during disconnection of the two strips from each other. My invention therefore makes it possible to conceal fastener elements and provide fastener strips of attractive appearance, and at the same time ensures strong attachment of the fastener elements to the strips.

A modification of the invention is shown in Figure 6 where the annular set of stitches 126 includes two superposed offset stitches 27 for each aperture 28 of the fastener element, while Figure 9 shows another modification wherein only two of the apertures 29 of the fastener element have the offset interlocking stitches 30 passing therethrough.

It will be understood by those skilled in the art that the shape of the fastener elements, the number and shape of the apertures, and the particular form of stitches may be modified without departing from the spirit or scope of the invention. It will also be understood that the longitudinal portions 10 and 23 of the lines of stitches may be omitted, and in some instances it is possible to omit the annular portions except the offset stitches and utilize only the offset stitches.

Therefore I do not desire to be understood as limiting myself in the details of construction except as required by the following claims when construed in the light of the prior art. The stitches may be of any suitable form, such as lock stitches, but for clearness in illustration are only schematically illustrated on the drawing, and a machine for making the tape as described has been constructed by me and is in operation.

I am aware that snap fastener elements having apertures for stitches have been sewed on the surface of a garment or a tape, and as shown by my patent snap fasteners have been concealed, but to my knowledge this present fastener tape is the first to embody concealed snap fasteners which are secured to the tape by a continuous line of stitches including stitches passing through apertures in the fastener elements and through the plies of material at both sides of the elements, so that the tape can be formed rapidly on automatic machines and is both strong and æsthetic in appearance.

Having thus described my invention, what I claim is:

1. Snap fastener tape comprising a strip of fabric having a plurality of plies, snap fastener elements arranged between two adjacent plies in spaced relation and having apertures to receive stitches, and a generally annular line of stitches passing through both of said two adjacent plies and snugly embracing each fastener element, said line of stitches also including offset stitches passing through said plies and said apertures.

2. Snap fastener tape comprising a strip of fabric having a plurality of plies, snap fastener elements arranged between two adjacent plies in spaced relation and having heads or sockets thereon and apertures between said heads or sockets and the edges of the elements, one of said plies having openings registering with the heads or sockets of the fastener elements, and stitches passing through both of said two adjacent plies and through said apertures for securing said fastener elements to the tape.

LEO ROSEMAN.